US012811272B2

(12) United States Patent
Kim et al.

(10) Patent No.: US 12,811,272 B2
(45) Date of Patent: Nov. 24, 2026

(54) MOUNTING APPARATUS FOR ANTENNA DEVICE ON SUPPORT POLE

(71) Applicant: KMW INC., Hwaseong-si (KR)

(72) Inventors: Duk Yong Kim, Yongin-si (KR); In Ho Kim, Yongin-si (KR); Kyo Sung Ji, Hwaseong-si (KR); Chi Back Ryu, Hwaseong-si (KR); Dae Myung Park, Hwaseong-si (KR); Min Sik Park, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 0 days.

(21) Appl. No.: 18/544,376

(22) Filed: Dec. 18, 2023

(65) Prior Publication Data

US 2024/0120637 A1 Apr. 11, 2024

Related U.S. Application Data

(63) Continuation of application No. PCT/KR2022/008515, filed on Jun. 16, 2022.

(30) Foreign Application Priority Data

Jun. 18, 2021 (KR) ........................ 10-2021-0079654
Jun. 15, 2022 (KR) ........................ 10-2022-0072704

(51) Int. Cl.

| | |
|---|---|
| ***H01Q 1/12*** | (2006.01) |
| ***F16B 2/06*** | (2006.01) |
| ***H01Q 3/08*** | (2006.01) |

(52) U.S. Cl.

CPC ............... *H01Q 1/12* (2013.01); *F16B 2/065* (2013.01); *H01Q 3/08* (2013.01)

(58) Field of Classification Search

CPC .... H01Q 1/1207; H01Q 1/1242; H01Q 1/246; H01Q 1/12; H01Q 3/08; F16B 2/065

See application file for complete search history.

(56) References Cited

U.S. PATENT DOCUMENTS 6,342,870 B1 1/2002 Mehrkens et al.
7,106,273 B1 * 9/2006 Brunson ................ H01Q 1/246 343/890

(Continued)

FOREIGN PATENT DOCUMENTS

CN 211829184 U 10/2020
KR 10-2009-0028331 A 3/2009

(Continued)

OTHER PUBLICATIONS

International Search Report mailed Sep. 21, 2022 for International Application No. PCT/KR2022/008515 and its English translation.

(Continued)

*Primary Examiner* — Brian E Glessner
(74) *Attorney, Agent, or Firm* — Lex IP Meister, PLLC

(57) ABSTRACT

The present invention relates to a mounting apparatus for an antenna device on a support pole. Particularly, the apparatus comprises: a support clamp installed on a support pole; and a directivity adjustment part comprising a tilting means and a steering means, the tilting means, for two or more antenna devices coupled via the support clamp so as to be spaced apart in the vertical direction, tilting the two or more antenna devices at the same time or at different times in the front/rear direction via a left/right tilting axis, and the steering means steer-rotating the two or more antenna devices in the left/right direction with respect to a vertical axis, wherein, of the directivity adjustment part, the tilting means is provided so that tilt-rotation is manually adjusted by a worker or is automatically adjusted by a power supply, and thus the advantages of not only reducing costs but also easily adjusting the directivity of the antenna devices are provided.

12 Claims, 14 Drawing Sheets

(56) References Cited

U.S. PATENT DOCUMENTS

| | | | | |
|---|---|---|---|---|
| 2002/0105478 | A1 | 8/2002 | Overton | |
| 2021/0408661 | A1* | 12/2021 | Yoo | H01Q 1/246 |
| 2021/0408662 | A1* | 12/2021 | Yoo | H01Q 1/1264 |
| 2024/0120650 | A1* | 4/2024 | Kim | F16C 11/04 |
| 2024/0136698 | A1* | 4/2024 | Kolokotronis | H01Q 1/1264 |

FOREIGN PATENT DOCUMENTS

| | | | | | |
|---|---|---|---|---|---|
| KR | 100892138 | B1 | * | 4/2009 | |
| KR | 200454837 | Y1 | * | 7/2011 | |
| KR | 10-2018-0056182 | A | | 5/2018 | |
| KR | 10-2004127 | B1 | | 7/2019 | |
| KR | 10-2095871 | B1 | | 4/2020 | |
| KR | 102145150 | B1 | * | 8/2020 | |
| KR | 10-2020-0115088 | A | | 10/2020 | |
| KR | 10-2164283 | B1 | | 10/2020 | |
| WO | WO-2021040461 | A1 | * | 3/2021 | F16F 15/02 |

OTHER PUBLICATIONS

Extended European Search Report mailed on Apr. 25, 2025 from the European Patent Office for Application No. 22825339.9.

Office Action mailed on Jul. 8, 2025 from Korean Patent Office for Application No. 10-2023-0065453.

* cited by examiner

[FIG. 1]
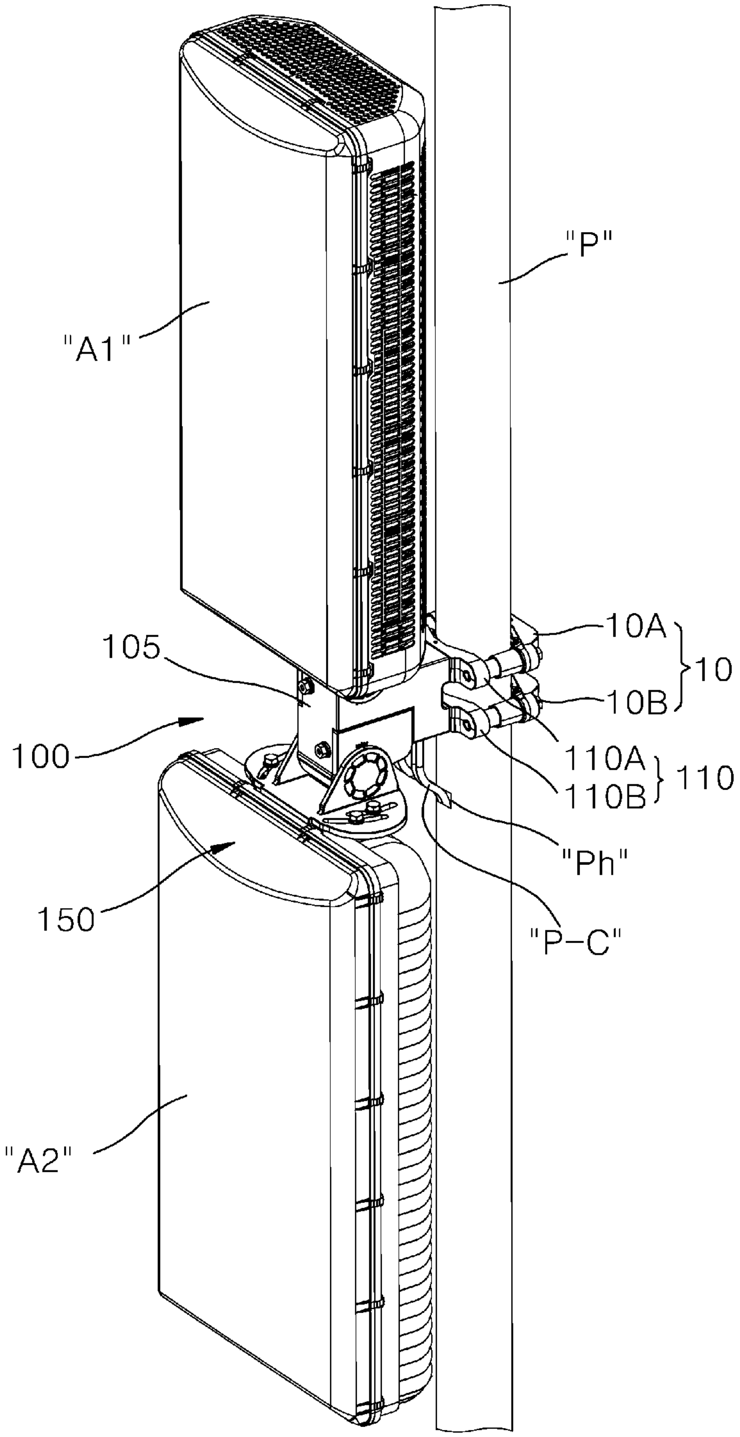

[FIG. 2]
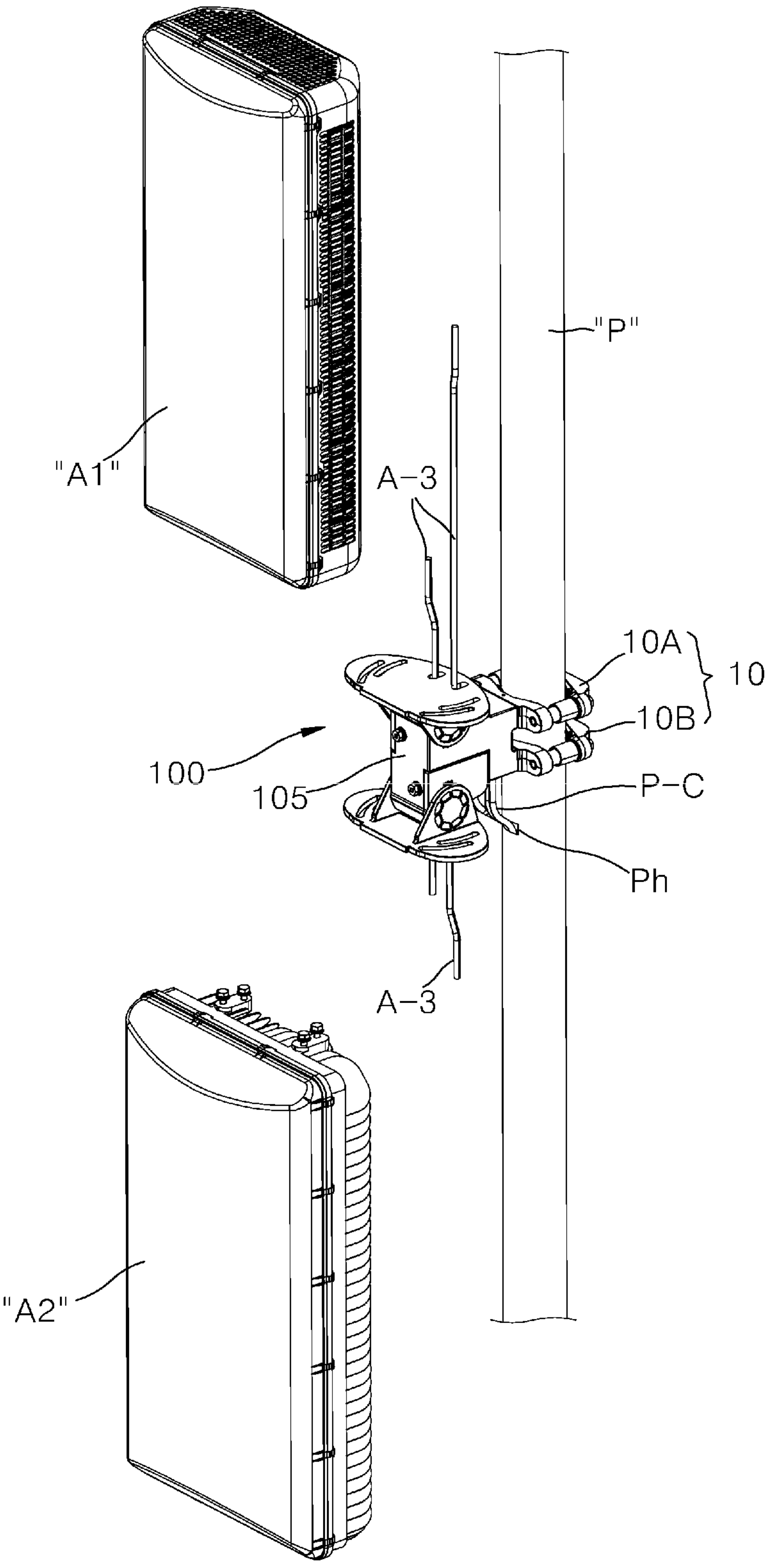

[FIG. 3A]
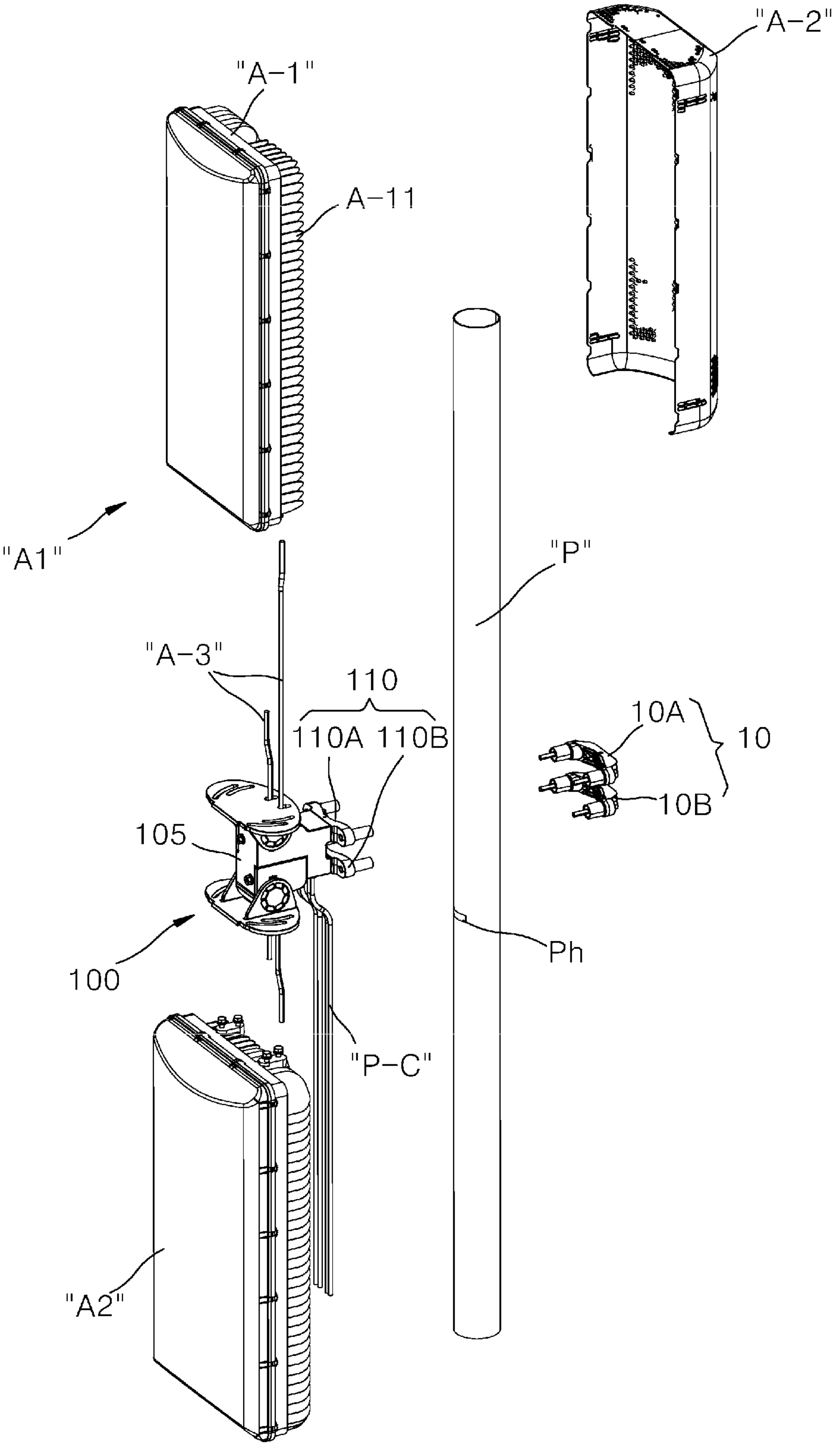

[FIG. 3B]
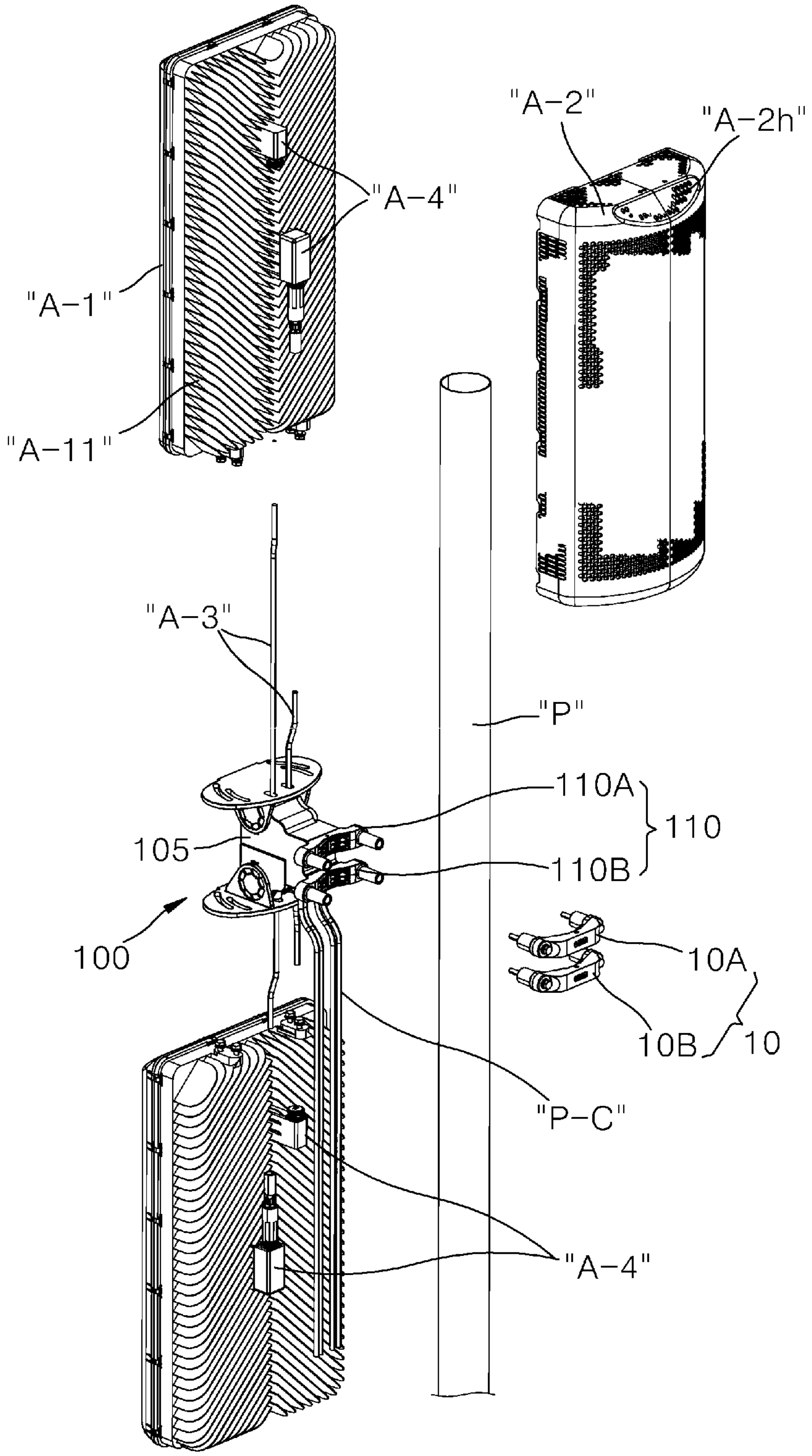

[FIG. 4A]
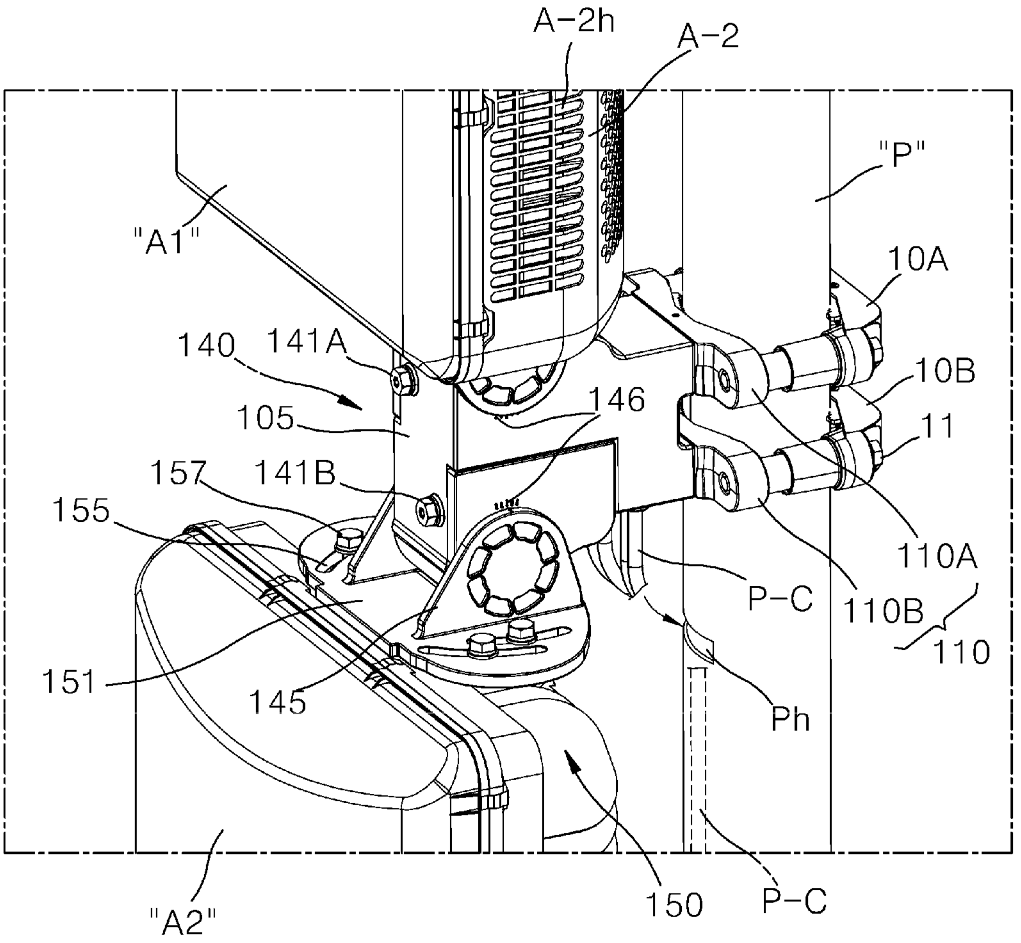

[FIG.4B]
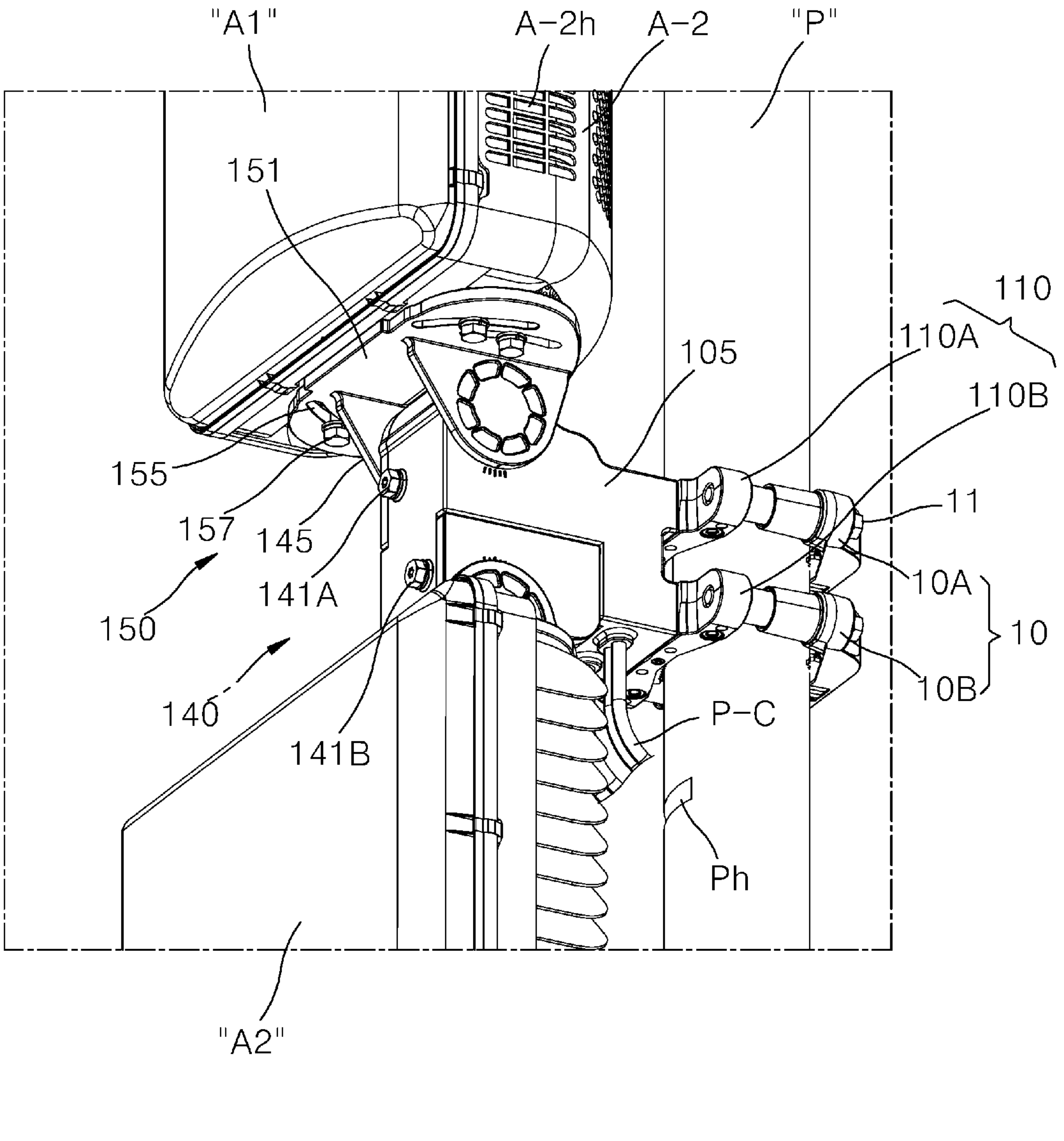

[FIG. 5]
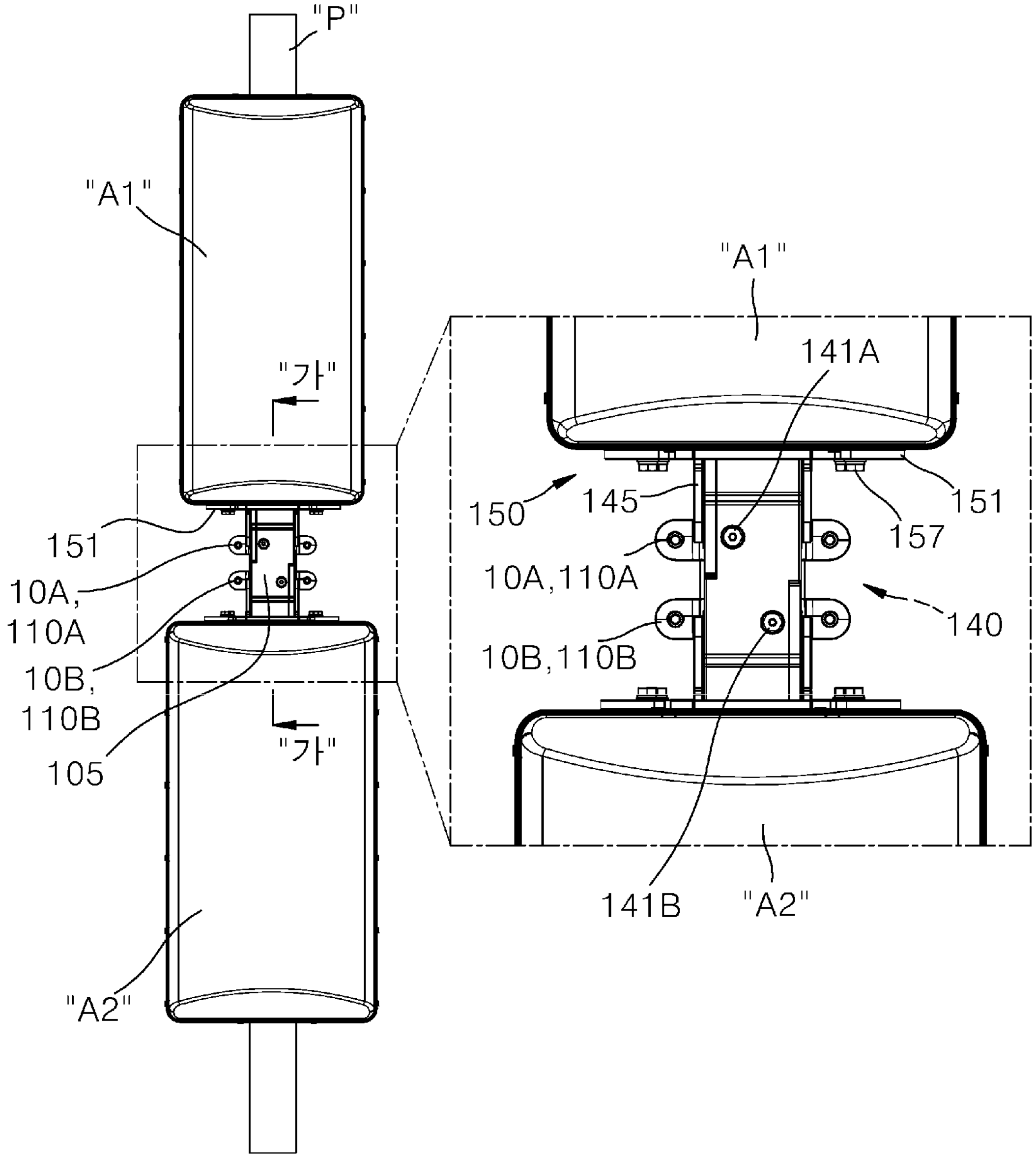

[FIG. 6]
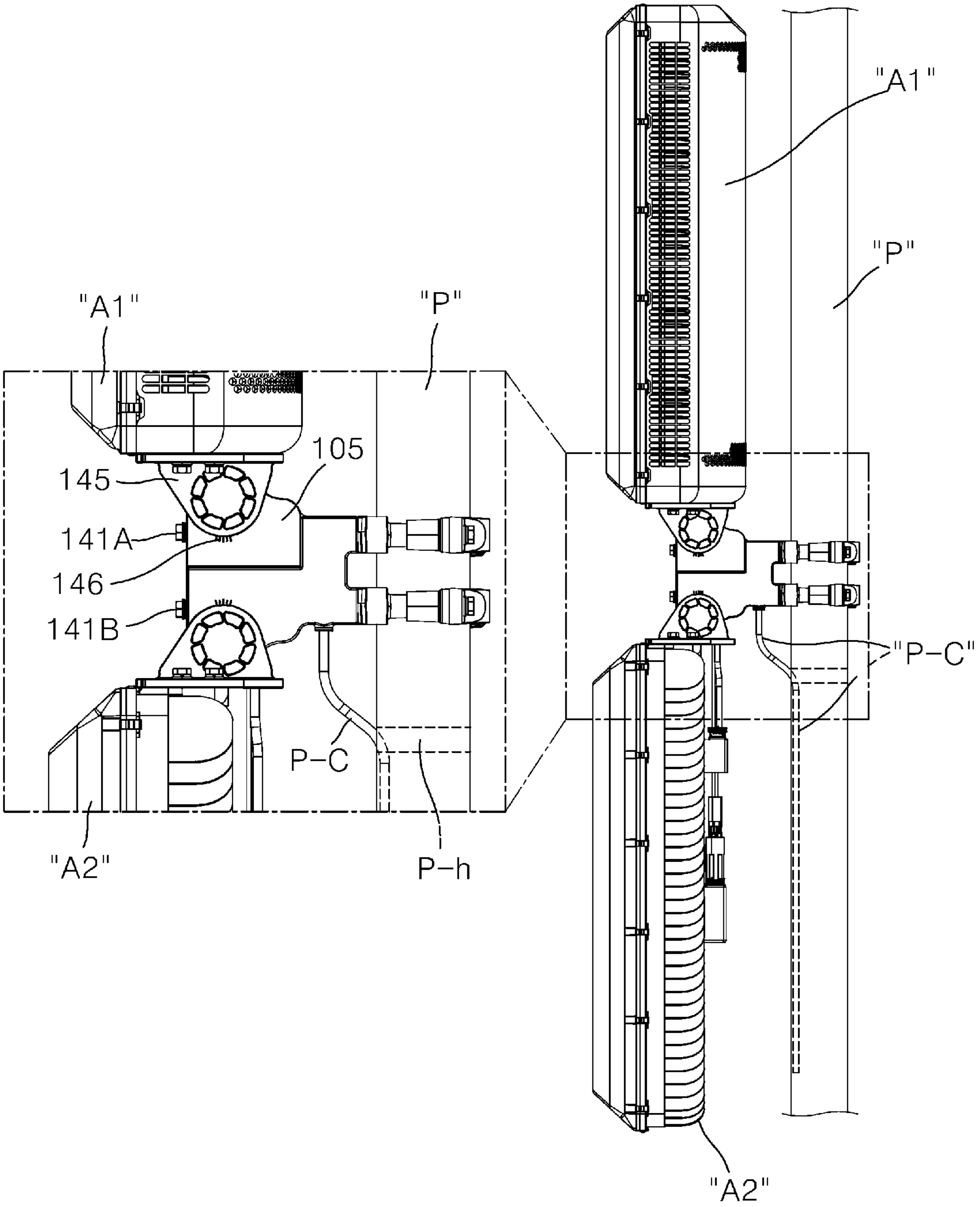

[FIG. 7A]
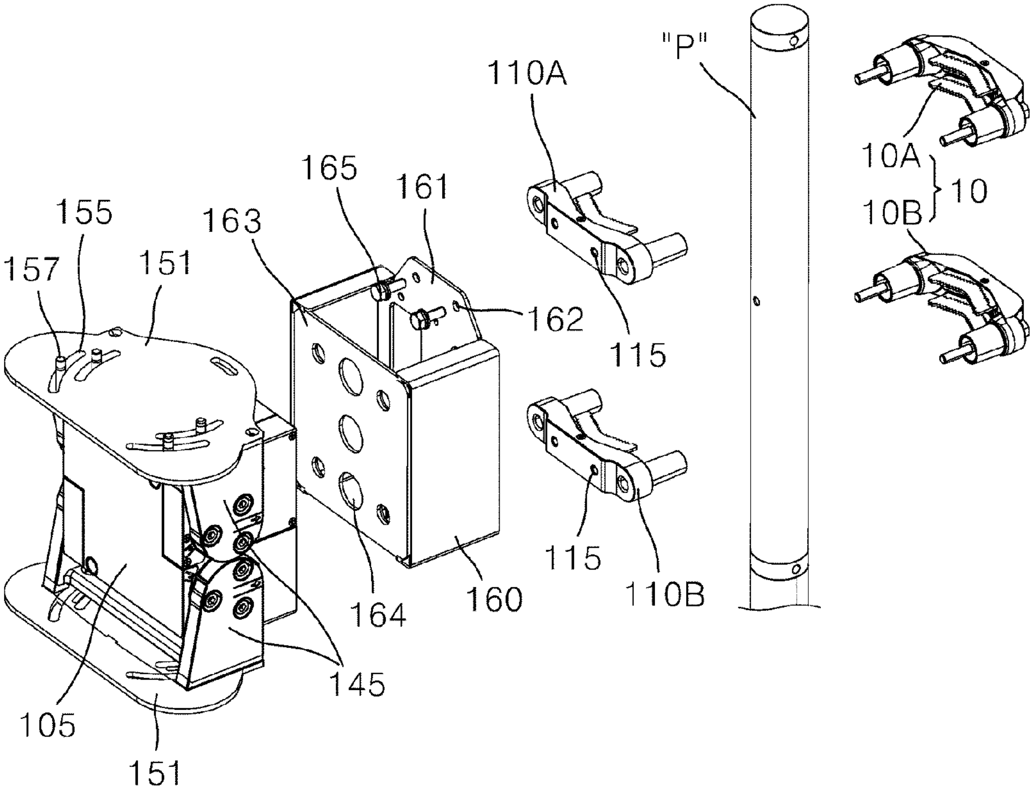

[FIG. 7B]
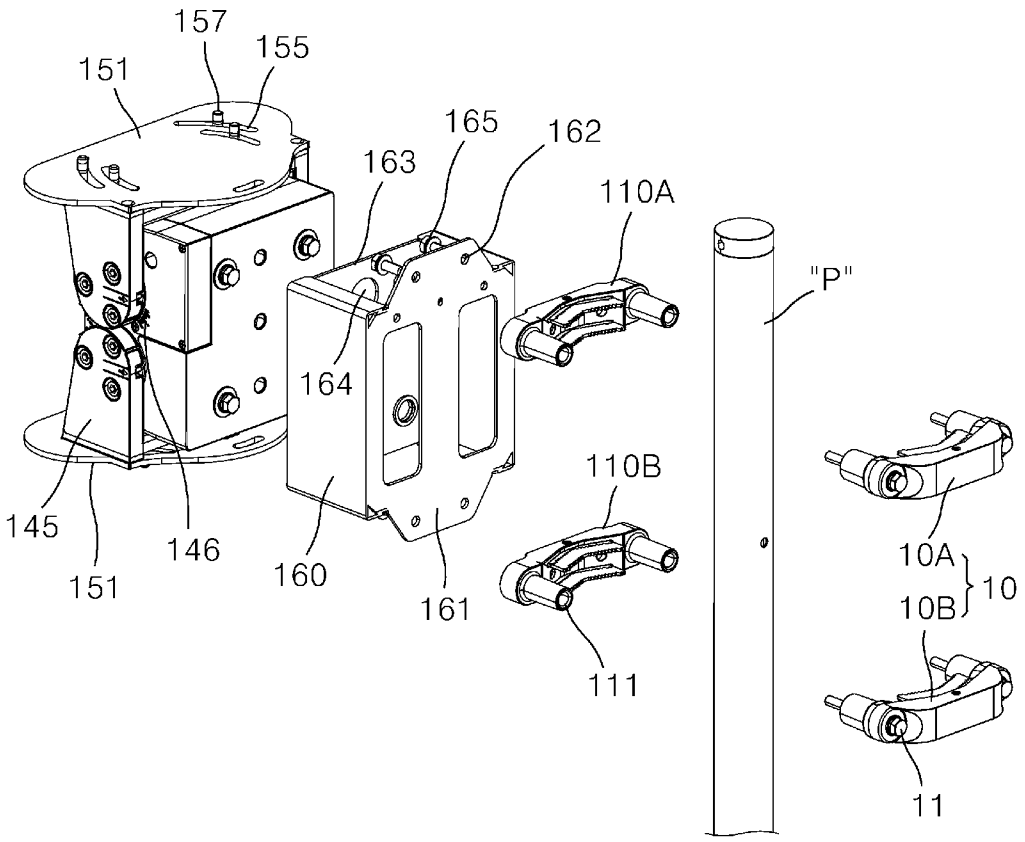

[FIG. 8]
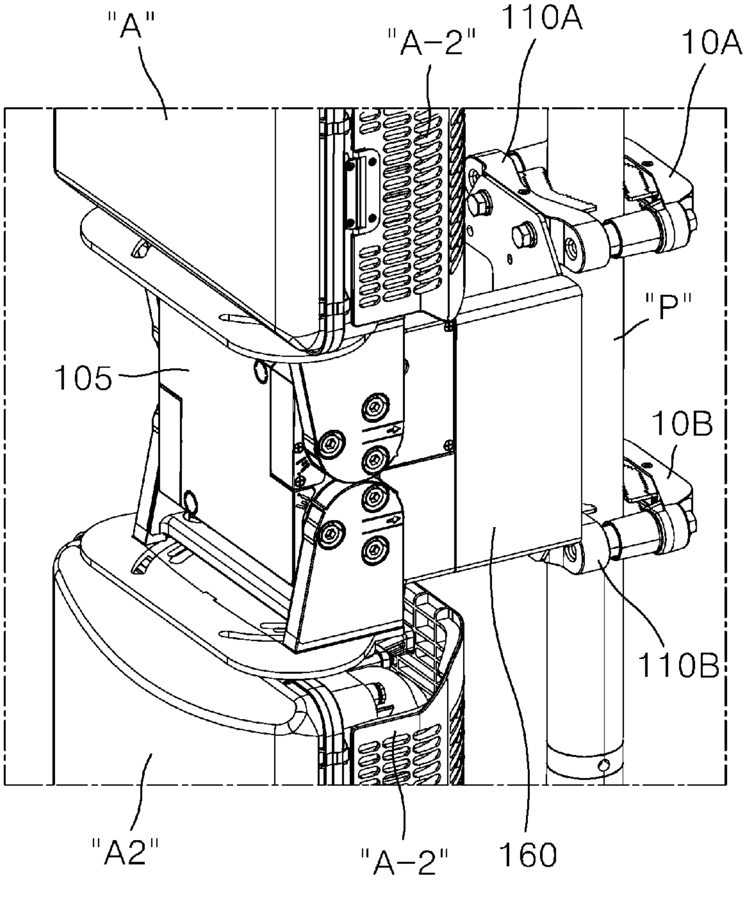

[FIG. 9A]
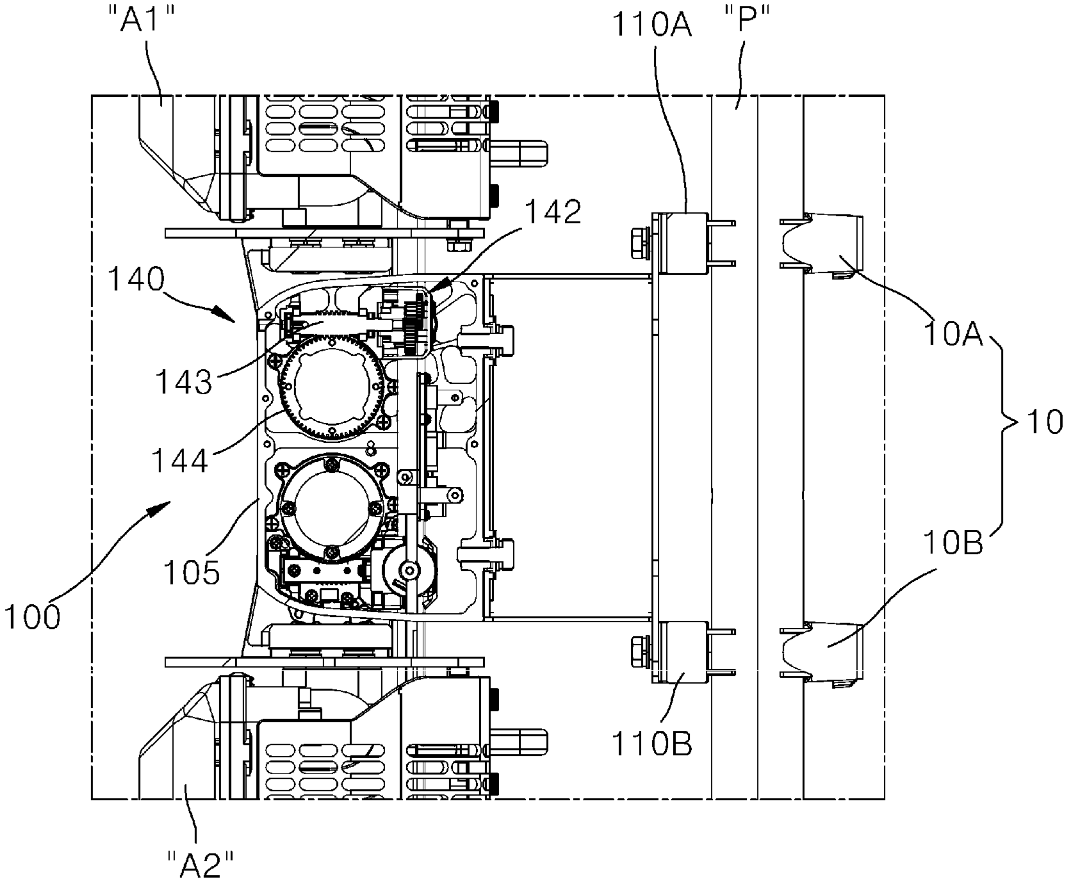

[FIG. 9B]
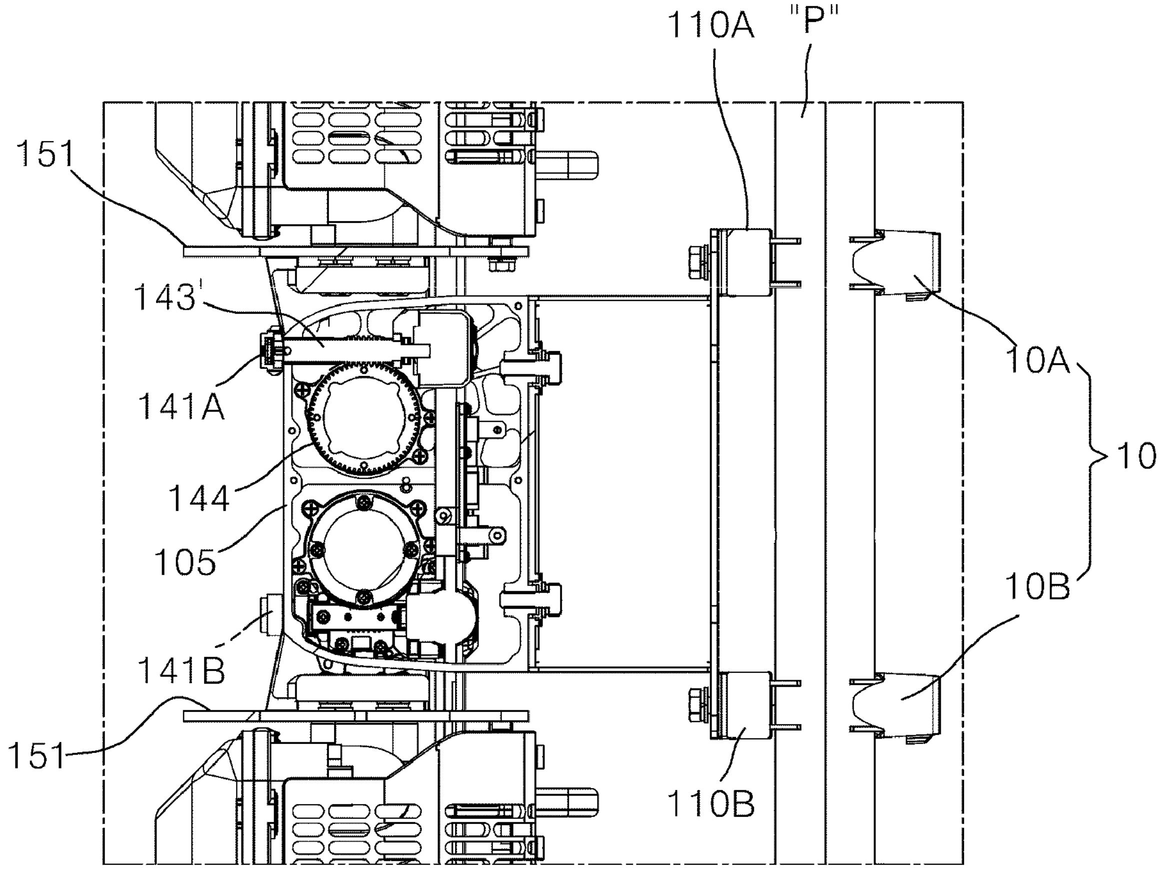

[FIG. 10]
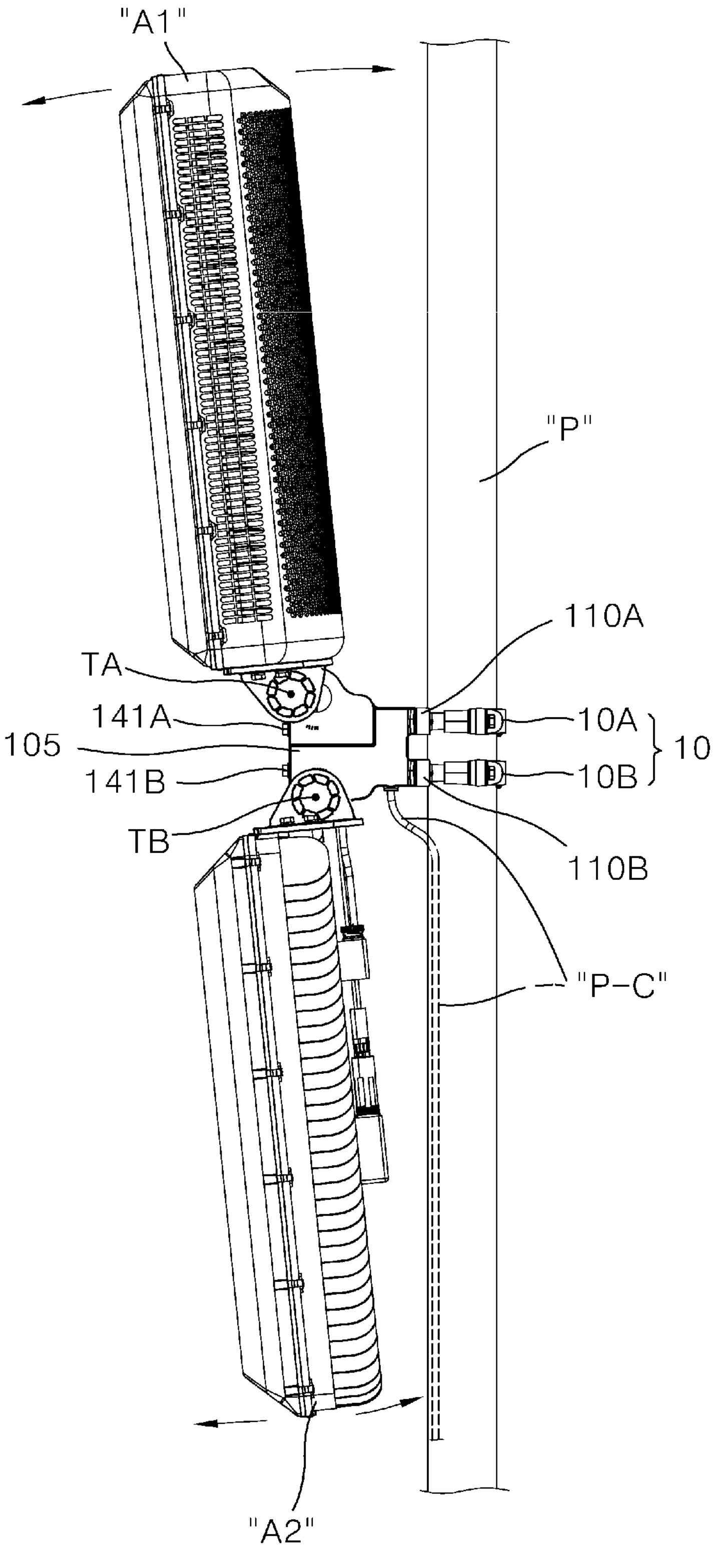

MOUNTING APPARATUS FOR ANTENNA DEVICE ON SUPPORT POLE

CROSS-REFERENCE TO RELATED APPLICATIONS

This application is a continuation application of International Application No. PCT/KR2022/008515, filed Jun. 16, 2022, which claims the benefit of Korean Patent Application Nos. 10-2021-0079654, filed Jun. 18, 2021; and 10-2022-0072704, filed Jun. 15, 2022, in the Korean Intellectual Property Office, the disclosures of which are incorporated herein in their entirety by reference.

TECHNICAL FIELD

The present disclosure relates to a mounting apparatus for antenna devices on a support pole, and more particularly, to a mounting apparatus for antenna devices on a support pole, including tilting means and steering means which capable of installing two or more antenna devices so that the two or more antenna devices are separated from each other in up and down directions with respect to a single support clamp and of adjusting the tilting rotation of the two or more antenna devices in the up and down directions and adjusting the steering rotation of the two or more antenna devices in a horizontal direction simultaneously or at different times.

BACKGROUND ART

An antenna for wireless communication is commonly installed at a high place where surroundings are open for smooth transmission and reception with an apparatus for wireless communication that is disposed at a long distance.

To this end, the antenna is installed in an electric pole, a pylon, a building rooftop (rooftop), etc. Particularly, if an antenna device is installed in a support pole having a form such as an electric pole, a space usage fee (rent) needs to be paid to a lessor who operates a facility, such as a support pole.

However, in the case of the support pole, it is preferred that the antenna devices are intensively installed in a limited space in terms of costs. However, if the antenna devices are intensively installed, there is a concern of radiation and interference from a surrounding antenna device. Furthermore, there is a problem in that it is difficult to adjust the direction of the antenna device (e.g., the adjustment of steering rotation in the horizontal direction and the adjustment of tilting rotation in the up and down directions).

Furthermore, as the number of antenna devices installed is increased, various cables that are provided for a connection between an external wire for the supply of external power and a control unit act as a factor that degrades the beauty of the surroundings of the support pole because the various cables are frequently exposed to the outside.

DISCLOSURE

Technical Problem

The present disclosure has been made to solve the aforementioned problems, and an object of the present disclosure is to provide a mounting apparatus for antenna devices on a support pole, which can intensively install antenna devices on a support pole having a limited space and also easily adjust the direction of the antenna device.

Furthermore, another object of the present disclosure is to provide a mounting apparatus for antenna devices on a support pole, in which antenna devices are installed at two up and down places with respect to a single support clamp of a support pole so that two types of frequency bands can be covered and the direction of an antenna device for each frequency band can be easily adjusted toward a desired location by using tilting means and/or steering means.

Furthermore, still another object of the present disclosure is to provide a mounting apparatus for antenna devices on a support pole, which can sublate the exposure of an external appearance of an external wire or cable that is provided for an operation of an antenna device.

Objects of the present disclosure are not limited to the aforementioned object, and the other objects not described above may be evidently understood from the following description by those skilled in the art.

Technical Solution

A mounting apparatus for antenna devices on a support pole according to an embodiment of the present disclosure includes a support clamp installed in a support pole and a direction adjustment part including tilting means for tilting and rotating two or more antenna devices that have been coupled to be spaced apart from each other in up and down directions through the medium of the support clamp in forward and backward directions through the medium of axes on left and right sides thereof simultaneously or at different times and steering means for steering and rotating the two or more antenna devices in a horizontal direction on the basis of an upper and lower axis. The tilting rotation of the tilting means of the direction adjustment part is manually adjusted by a worker or automatically adjusted by power supply.

In this case, the tilting means may include upper tilting means for tilting a first antenna device that is disposed on a relatively upper side and lower tilting means for tilting a second antenna device that is disposed on a relatively lower side.

Furthermore, the upper tilting means and the lower tilting means may include a tilting housing coupled to the support clamp, an upper driving motor and a lower driving motor provided within the tilting housing and electrically rotated and driven, an upper gear set and a lower gear set configured to output rotatory power of the upper driving motor and the lower driving motor by decelerating the rotatory power when the rotatory power is input, and an upper worm wheel gear part and a lower worm wheel gear part each configured to axially penetrate the tilting housing in the horizontal direction to constitute a tilting axis and to be rotated by receiving the driving power output by the gear set by worm wheel gear teeth formed in an outer circumferential surface thereof.

Furthermore, the upper tilting means and the lower tilting means may include a tilting housing coupled to the support clamp, an upper tilting adjustment bolt and a lower tilting adjustment bolt each provided rotatably around an axis that is front and rear horizontal within the tilting housing and each configured to have worm gear teeth formed in an outer circumferential surface thereof, and an upper worm wheel gear part and a lower worm wheel gear part each configured to axially penetrate the tilting housing in the horizontal direction to constitute a tilting axis and each rotated by an engagement of worm wheel gear teeth formed in an outer circumferential surface thereof and the worm gear teeth of each of the upper tilting adjustment bolt and the lower tilting adjustment bolt.

Furthermore, the two or more antenna devices may each have a bottom surface or a top surface coupled to a top surface or bottom surface of a steering mounting panel and are each capable of being steered and rotated in the horizontal direction. The two or more antenna devices may be coupled to be tilted and rotated in the forward and backward directions through the medium of a pair of tilt brackets integrally extended and formed so that the tilt brackets are adjacent to outsides on the left and right of the tilting housing.

Furthermore, the tilt brackets may be coupled to both ends of the worm wheel gear part so that the tilt brackets are rotated coaxially with the tilting axes.

Furthermore, the steering means of the direction adjustment part may include an upper steering mounting panel and a lower steering mounting panel each configured to have a top surface coupled to a bottom surface of any one of the two or more antenna devices or to have a bottom surface coupled to a top surface of another of the two or more antenna devices, at least one guide slot formed in the upper steering mounting panel and lower steering mounting panel in a way to penetrate the upper steering mounting panel and lower steering mounting panel up and down so that the at least one guide slot corresponds to steering rotation trajectories of the antenna devices, and at least one guide bolt coupled to a lower or upper part of the antenna device by bolting and bolted and fastened to the lower or upper part of the antenna device through the at least one guide slot.

Furthermore, the two or more antenna devices may be coupled so that the steering rotations of the two or more antenna devices are adjustable in the horizontal direction within a range of the at least one guide slot formed in the upper steering mounting panel and lower steering mounting panel.

Furthermore, the mounting apparatus may further include a wire enclosure that is disposed between the support clamp and the tilting housing and in which at least one external wire provided to be electrically connected to the at least two antenna devices is concealed and accommodated.

Furthermore, a support wire installation hole in which an external wire is accommodated is communicatively formed in the support pole.

Furthermore, the at least two antenna devices may be connected to a control unit that is disposed within the tilting housing through the medium of a cable. The cable may be concealed and installed through a concealment cover that is attached to a rear surface of each of the at least two antenna devices.

Furthermore, the steering means of the direction adjustment part may include an upper steering mounting panel and a lower steering mounting panel configured to have a top surface coupled to a top surface of any one of the two or more antenna devices or a bottom surface coupled to a top surface of another of the two or more antenna devices. The cable may be connected to the rear surface part of the antenna device through the upper steering mounting panel and lower steering mounting panel after penetrating the tilting housing.

Advantageous Effects

According to the mounting apparatus for antenna devices on a support pole according to an embodiment of the present disclosure, advantages in that antenna devices can be intensively installed with respect to the support pole and the direction of an installed antenna device can be easily adjusted can be achieved.

Furthermore, the present disclosure has an effect in that two types of frequency bands can be covered because antenna devices can be installed at two up and down places with respect to a single support clamp of the support pole.

Furthermore, the present disclosure has an effect in that the degradation of the beauty of surroundings of the support pole can be prevented because the exposure of an external appearance of an external wire or cable that is provided for an operation of an antenna device is sublated to a minimum.

DESCRIPTION OF DRAWINGS

FIG. 1 is a perspective view illustrating the state in which antenna devices have been installed in a mounting apparatus for antenna devices on a support pole according to an embodiment of the present disclosure.

FIG. 2 is an exploded perspective view illustrating that the antenna devices have been separated from the mounting apparatus for antenna devices on a support pole in FIG. 1.

FIGS. 3A and 3B are exploded perspective views of a front part and a rear part illustrating the state in which a support clamp and a direction adjustment part have been separated.

FIGS. 4A and 4B are a downward perspective view and upward perspective view illustrating the direction adjustment part.

FIG. 5 is a front view of FIG. 1 and a partially enlarged view thereof.

FIG. 6 is a side view of FIG. 1 and a partially enlarged view thereof.

FIGS. 7A and 7B are backward and forward exploded perspective views of some components illustrating a mounting apparatus for antenna devices on a support pole according to another embodiment of the present disclosure.

FIG. 8 is a partially enlarged perspective view illustrating the state in which an antenna device for a support pole has been installed on the support pole according to another embodiment of the present disclosure in FIGS. 7A and 7B.

FIGS. 9A and 9B are cross-sectional views taken along line "가-가" in FIG. 5 and are cross-sectional views illustrating tilting means capable of automatic (refer to FIG. 9A) and manual (refer to FIG. 9B) operations, respectively.

FIG. 10 is a side view illustrating the antenna devices after being tilted in FIG. 1.

LIST OF REFERENCE NUMERALS

P: support pole
A1, A2: antenna device
10, 110: support clamp
10: outside clamp
10A: upper clamp
10B: lower clamp
100: mounting apparatus
105: tilting housing
110: inside clamp
110A: upper clamp
110B: lower clamp
140: tilting means
141A, 141B: bolt cap
142: gear set
143: worm gear part
143': tilting adjustment bolt
144: worm wheel gear part -continued 145: tilt bracket
146: tilting angle gauge
150: steering means
151: steering mounting panel
155: guide slot
157: guide bolt
160: wire enclosure
161: rear surface
162: screw through hole
163: front surface
164: wire through hole
165: fixing screw
Ph: support wire installation hole
P-C: external wire

BEST MODE

Hereinafter, a mounting apparatus for antenna devices on a support pole according to an embodiment of the present disclosure is described in detail with reference to the accompanying drawings.

In adding reference numerals to the components of each drawing, it should be noted that the same components have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

Furthermore, in describing components of an embodiment of the present disclosure, terms, such as a first, a second, A, B, (a), and (b), may be used. Such terms are used only to distinguish one component from another component, and the essence, order, or sequence of a corresponding component is not limited by the terms. All terms used herein, including technical or scientific terms, have the same meanings as those commonly understood by a person having ordinary knowledge in the art to which an embodiment pertains, unless defined otherwise in the specification. Terms, such as those commonly used and defined in dictionaries, should be construed as having the same meanings as those in the context of a related technology, and are not construed as having ideal or excessively formal meanings unless explicitly defined otherwise in the specification.

FIG. 1 is a perspective view illustrating the state in which antenna devices have been installed in a mounting apparatus for antenna devices on a support pole according to an embodiment of the present disclosure. FIG. 2 is an exploded perspective view illustrating that the antenna devices have been separated from the mounting apparatus for antenna devices on a support pole in FIG. 1. FIGS. 3A and 3B are exploded perspective views of a front part and a rear part illustrating the state in which a support clamp and a direction adjustment part have been separated.

As referred in FIGS. 1 to 3B, the mounting apparatus for antenna devices on a support pole according to an embodiment of the present disclosure may include support clamps 10 and 110 that are installed in a central portion of a support pole P.

As referred in FIG. 1, the support clamps 10 and 110 may include upper clamps 10A and 110A that are disposed on a relatively upper side and lower clamps 10B and 110B that are disposed on a relatively lower side, respectively.

In this case, as referred in FIGS. 3A and 3B, if a direction of the support clamp 10, 110 in which an antenna device A1, A2 has been installed on the basis of the support pole P is defined as an "inside" and a direction opposite to the direction is defined as an "outside", the support clamps 10 and 110 may be named by being divided into an outside clamp 10 that is coupled to surround the outside of an outer circumferential surface of the support pole P and an inside clamp 110 that is coupled to surround the inside of the outer circumferential surface of the support pole P.

First, after the upper clamp 110A and lower clamp 110B of the inside clamp 110 are disposed to surround the inside of the outer circumferential surface of the support pole P, the upper clamp 10A and lower clamp 10B of the outside clamp 10 are disposed to surround the outside of the outer circumferential surface of the support pole P. The inside clamp 110 and the outside clamp 10 may be stably installed at a location of the support pole P having a desired height, by using a clamp fixing bolt 11 (refer to FIGS. 4A and 4B).

A total of four clamp fixing bolts 11 may be provided, and may be tilted and assembled to both ends of the upper clamps 10A and 110A on the left and right sides thereof and both ends of the lower clamps 10B and 110B on the left and right sides thereof, respectively, in forward and backward directions.

In this case, clamping gear panels (refer to reference numeral 12 in FIG. 7A) that form a predetermined frictional force by being closely attached to the outer circumferential surface of the support pole P by bolting coupling power that is transferred by the clamp fixing bolts 11 may be provided in respective portions of the outside clamp 10 and the inside clamp 110, which are directed toward the support pole P.

The clamping gear panels 12 may be fabricated to have various sizes and specifications according to the diameter of the support pole P, and may be detachably coupled to the outside clamp 10 and the inside clamp 110, respectively.

Meanwhile, the mounting apparatus 100 for an antenna device on a support pole according to an embodiment of the present disclosure may further include direction adjustment parts 140 and 150 including tilting means 140 for tilting the two or more antenna devices A1 and A2 that are coupled to be spaced apart from each other in up and down directions through the medium of the support clamps 10 and 110 simultaneously or at different times through the medium of tilting axes TA and TB on the left and right sides thereof and steering means 150 for steering and rotating the two or more antenna devices A1 and A2 in the horizontal direction around an upper and lower axis thereof.

The direction adjustment part 140, 150 means mean for adjusting the direction of the antenna device in a wide sense so that the antenna device A1, A2 can perform an efficient implementation of beamforming in its desired direction.

In this case, the tilting means 140 may be manually tilted by a manipulation of a worker or may be automatically tilted by power that is supplied to driving motors (reference numerals not indicated) that are electrically driven.

For example, as referred in FIG. 9A described later, the driving motor (reference numeral not indicated) that is electrically driven may be provided within a tilting housing 105, and may be provided to tilt and rotate a tilt bracket 145 by tilting driving power that is transferred by the driving motor.

Furthermore, as referred in FIG. 9B described later, a tilting adjustment bolt 143' may be provided within the tilting housing 105 so that a worker can manually rotate the tilting means 140 by using a predetermined tool. The tilting means 140 may be provided to tilt and rotate the tilt bracket

145 by tilting driving power that is transferred by the rotation of the tilting adjustment bolt 143'. This is described more specifically later.

As referred in FIGS. 1 to 3B, in the mounting apparatus for antenna devices on a support pole according to an embodiment of the present disclosure, a cable A-3 that electrically connects a control unit (not illustrated) and the first antenna device A1 and the second antenna device A2 may be concealed and installed so that the cable is not exposed to the outside.

To this end, the first antenna device A1 and the second antenna device A2 may each further include a concealment cover A-2 that covers multiple heat sink pins A-11 that are integrally formed in a rear surface part thereof and that also conceals the cable A-3.

The concealment cover A-2 plays a role as a finger guard that prevents a worker or a body portion, such as a user's hand, from coming into direct contact with the multiple heat sink pins A-11 when high-temperature system heat that is generated when a system of each of the antenna devices A1 and A2 operates is discharged through the multiple heat sink pins A-11, and also functions to enable the cable A-3 to be concealed and installed as described above.

More specifically, assuming that the control unit is provided within the tilting housing 105 described later, the cable A-3 penetrates a steering mounting panel 151 that is connected to the top and bottom of the tilting housing 105 through the medium of the tilt bracket 145, and is then connected to connecting terminals A-4 that are directly provided in a rear surface part of the antenna device A1, A2. In this case, the exposure of the cable to the outside can be prevented by the concealment cover A-2.

Meanwhile, multiple through holes A-2*h* may be formed in the concealment cover A-2 in order to facilitate the heat exchange with the air of the multiple heat sink pins A-11 that have been integrally formed in the rear surface part of the antenna device A1, A2.

Furthermore, although not illustrated in the drawing, the concealment cover A-2 may be fabricated by being separated into two covers so that the two covers cover half the left side and half the right side of the rear surface part of the antenna device A1, A2, respectively.

FIGS. 4A and 4B are a downward perspective view and upward perspective view illustrating the direction adjustment part. FIG. 5 is a front view of FIG. 1 and a partially enlarged view thereof. FIG. 6 is a side view of FIG. 1 and a partially enlarged view thereof.

The steering means 150, among the direction adjustment parts 140 and 150, may include an upper steering mounting panel and lower steering mounting panel 151 having a top surface coupled to a bottom surface of any one (refer to reference numeral A1 in FIGS. 1 to 3B) of the two or more antenna devices A1 and A2 or each having a bottom surface coupled to a top surface of the other (refer to reference numeral A2 in FIGS. 1 to 3B) of the two or more antenna devices A1 and A2, at least one guide slot 155 formed in the upper steering mounting panel and lower steering mounting panel 151 to penetrate the upper steering mounting panel and lower steering mounting panel 151 up and down so that the at least one guide slot corresponds to the steering rotation trajectory of the antenna device A1, A2, and at least one guide bolt 157 coupled to a lower part or upper part of the antenna device A1, A2 by bolting and fastened to the lower part or upper part of the antenna device A1, A2 through the at least one guide slot 155.

In this case, in the case of the at least one guide slot 155, it is preferred that two guide slots formed within steering trajectories having different radiuses from an up and down axis, that is, the center of the steering rotation of the antenna device A1, A2, are provided to be spaced apart from each other on the left and right sides thereof, respectively, as a pair. In the case of the at least one guide bolt 157, it is also preferred that the number of guide bolts 157 that are inserted and fastened to the guide slots 155, respectively, is provided.

A worker may install the antenna devices A1 and A2 in the steering mounting panel 151 by an operation of disposing the antenna devices A1 and A2 on the top surface and bottom surface of the steering mounting panel 151, fastening the guide bolt 157 through the guide slot 155 upward or downward, but loosely fastening the guide bolt 157, adjusting the guide bolt 157 at a pre-designed steering rotation angle, and stably fastening the guide bolt 157 by strongly tightening the guide bolt 157.

In this case, the two or more antenna devices A1 and A2 are coupled so that the steering rotation of the two or more antenna devices is adjusted in the horizontal direction within the range of the at least one guide slot 155 that has been formed in the upper steering mounting panel and lower steering mounting panel 151.

As described above, according to the mounting apparatus 100 for an antenna devices according to an embodiment of the present disclosure, as referred in FIG. 5, the upper steering means 150 that is involved in the steering rotation of the first antenna device A1 in a horizontal direction thereof and the upper tilting means 140 that is involved in the tilting rotation of the first antenna device A1 in forward and backward directions thereof may be disposed on the upper side of the tilting housing 105 that is coupled to the support pole P through the medium of the support clamps 10 and 110. Furthermore, the upper steering means 150 that is involved in the steering rotation of the second antenna device A2 in a horizontal direction thereof and the upper tilting means 140 that is involved in the tilting rotation of the second antenna device A2 in forward and backward directions thereof may be disposed on the lower side of the tilting housing 105 that is coupled to the support pole P through the medium of the support clamps 10 and 110.

Meanwhile, as referred in FIG. 6, the mounting apparatus 100 for an antenna device according to an embodiment of the present disclosure may further include an external wire P-C for supplying external power from an external power unit (not illustrated) to the antenna devices A1 and A2 or the control unit (not illustrated).

In this case, the external wire P-C may be installed to be concealed from the outside by being inserted into the support pole P corresponding to a portion around the support clamps 10 and 110 so that the degradation of the beauty of appearance near the support pole P is minimized. To this end, a support wire installation hole Ph in which the external wire P-C is accommodated may be communicatively formed in the support pole P.

As described above, according to the mounting apparatus 100 for an antenna device on a support pole according to an embodiment of the present disclosure, there is provided an advantage in that the beauty of appearance around the support pole P can be prevented from being degraded because the exposure of the cable A-3 that connects the antenna devices A1 and A2 and the control unit and the external wire P-C that is connected to the control unit to the outside is minimized.

However, in the mounting apparatus 100 for an antenna device on a support pole according to an embodiment of the present disclosure, the first antenna device A1 and the second antenna device A2 need to be spaced apart from each other by a predetermined distance or more in the horizontal direction of the support pole P so that interference does not occur upon tilting rotation, in that the first antenna device A1 and the second antenna device A2 need to be provided to be capable of tilting rotation in the forward and backward directions thereof on the upper and lower sides of the tilting housing 105 described later, respectively. In this case, there is a concern that the tilting housing 105 needs to bear a moment load of the antenna device A1, A2, which is relatively great.

Hereinafter, an embodiment capable of solving the aforementioned problem and also fully solving the problem in that the exposure of the external wire P-C between the support wire installation hole Ph of the support pole P and the tilting housing 105 is to be disclosed. Furthermore, the tilting means 140 that has not been described, among the direction adjustment parts 140 and 150, will be described in detail hereinafter.

FIGS. 7A and 7B are backward and forward exploded perspective views of some components illustrating a mounting apparatus for antenna devices on a support pole according to another embodiment of the present disclosure. FIG. 8 is a partially enlarged perspective view illustrating the state in which an antenna device for a support pole has been installed on the support pole according to another embodiment of the present disclosure in FIGS. 7A and 7B. FIGS. 9A and 9B are cross-sectional views taken along line "가-가" in FIG. 5 and are cross-sectional views illustrating tilting means capable of automatic (refer to FIG. 9A) and manual (refer to FIG. 9B) operations, respectively.

As referred in FIGS. 7A to 9B, the mounting apparatus 100 for an antenna device on a support pole according to another embodiment of the present disclosure may further include a wire enclosure 160 that is disposed between the support clamps 10 and 110 and the tilting housing 105, among the components of the tilting means 140 described later, and in which the at least one external wire P-C provided to be electrically connected to the at least two antenna devices A1 and A2 is concealed and accommodated.

The wire enclosure 160 is formed in an approximately hexahedron closure shape. A front surface 163 of the wire enclosure may be firmly fixed to a rear surface of the tilting housing 105. A rear surface 161 of the wire enclosure may be fixed to four points of the upper clamp 110A and lower clamp 110B of the inside clamp 110, among the support clamps 10 and 110 in a screw coupling way using a fixing screw 165.

To this end, a screw through hole 162 through which the fixing screw 165 penetrates may be formed in the rear surface 161 of the wire enclosure 160. Screw fastening holes 115 to which the fixing screws 165 are fastened, respectively, may be formed in the upper clamp 110A and the lower clamp 110B, respectively.

The wire enclosure 160 is formed of a panel having a stiff material having stiffness to the extent that the stiff material can withstand at least a moment load of the antenna devices A1 and A2, and is formed in a closure shape the inside of which has an empty form. At least one wire through hole 164 through which the external wire P-C penetrates and is inserted into the tilting housing 105 may be formed in the front surface 163.

In this case, although not illustrated in the drawings, the support wire installation hole Ph formed in the support pole P is formed between the upper clamp 110A and the lower clamp 110B. The exposure of the external wire P-C can be fully blocked because external wire P-C is concealed by the wire enclosure 160.

As described above, the mounting apparatus 100 for an antenna device on a support pole according to another embodiment of the present disclosure provides an advantage in that it can block interference between the tilting rotations of the antenna devices A1 and A2 and also fully block the exposure of the external wire P-C to the outside by securing a horizontal isolation distance between the support pole P and the antenna devices A1 and A2 through the additional provision of the wire enclosure 160.

Meanwhile, as referred in FIGS. 7A to 9B, the tilting means 140, among the direction adjustment parts 140 and 150, may include upper tilting means for tilting the first antenna device A1 that is disposed on a relatively upper side and lower tilting means for tilting the second antenna device A2 that is disposed on a relatively lower side.

In this case, only the antenna devices A1 and A2 in which the upper tilting means and the lower tilting means are installed are different, and the components of the upper tilting means and the components of the lower tilting means are fully symmetrically disposed up and down on the basis of the tilting housing 110 described later. Hereinafter, the upper tilting means is mainly described in detail without describing the upper tilting means and the lower tilting means by dividing the tilting means into the upper tilting means and the lower tilting means.

The tilting means 140 may include the tilting housing 105 that is coupled to the support clamps 10 and 110, a driving motor (reference numeral not indicated) that is disposed within the tilting housing 105 and that is electrically rotated and driven, a gear set 142 that outputs rotatory power of the driving motor by decelerating the rotator power when the rotator power is input, and a worm wheel gear part 144 that axially penetrates the tilting housing 105 in the horizontal direction to constitute a tilting axis and that is rotated by receiving the driving power output by the gear set 142 by worm wheel gear teeth thereof formed in an outer circumferential surface thereof.

In this case, the tilting means 140 may further include a worm gear part 143 that is disposed between the gear set 142 and the worm wheel gear part 144 and in which worm gear teeth that are extended from the shaft of any one gear of the gear set 142 and that are engaged with the worm wheel gear teeth of the worm wheel gear part 144 have been formed.

More specifically, as referred in FIG. 9A, when the driving motor rotates and operates, the gear set 142 receives rotatory power of the driving motor and outputs the rotatory power by decelerating the rotatory power at a predetermined reduction gear ratio. The rotatory driving power output by the gear set 142 is transferred to the worm wheel gear part 144 through the medium of the worm gear part 143. Accordingly, the tilting rotations of the antenna devices A1 and A2 can be automatically adjusted by an operation of the worm wheel gear part 144 that constitutes the tilting axis being rotated.

However, the tilting means 140 does not need to be provided so that the tilting means 140 is essentially automatically tilted and operated by the driving motor.

That is, as referred in FIG. 9B, the tilting means 140 may include the tilting housing 105 that is coupled to the support clamps 10 and 110, a tilting adjustment bolt 143' that is provided rotatably around an axis that is front and rear horizontal within the tilting housing 105 and that has worm gear teeth formed in an outer circumferential surface thereof, and a worm wheel gear part 144 that axially penetrates the tilting housing 110 in the horizontal direction to constitute a tilting axis and that is rotated by the engagement of worm wheel gear teeth formed in an outer circumferential surface thereof and the worm gear teeth of the tilting adjustment bolt 143'.

Each head part of the tilting adjustment bolt 143' is disposed to be exposed to a front surface of the tilting housing 105. Accordingly, a worker can adjust the tilting angle of each of the antenna devices A1 and A2 by rotating the tilting adjustment bolt 143' in one direction or the other direction by using a predetermined adjustment tool (a driver, a hex key, etc). The head part of the tilting adjustment bolt 143', which has been exposed to the front surface of the tilting housing 105, may be shielded by each of bolt caps 141A and 141B.

In this case, the tilting means 140 are provided on the upper and lower sides of the tilting housing 105, respectively. The tilting adjustment bolt 143' on the upper side may be defined as an "upper tilting adjustment bolt". The tilting adjustment bolt 143' on the lower side may be defined as a "lower tilting adjustment bolt". Likewise, the worm wheel gear part 144 on the upper side of the tilting housing 105 may be defined as an "upper worm wheel gear part". The worm wheel gear part 144 on the lower side of the tilting housing 105 may be defined as a "lower worm wheel gear part".

Unlike the tilting means 140 described with reference to FIG. 9A, the tilting means 140 having the manual operation type, which has been described with reference to FIG. 9B as described above, alternately includes the tilting adjustment bolt 143' that performs a function similar to that of the worm gear part 143 instead of omitting the driving motor and the gear set 142. Accordingly, there is provided an advantage in that internal components of the tilting housing 105 are simplified.

Meanwhile, the two or more antenna devices A1 and A2 may be coupled to a pair of tilt brackets 145 that are connected to the worm wheel gear part 144 that constitutes the tilting axis so that the tilt brackets 145 are rotated coaxially with the worm wheel gear part 144, through the medium of the steering mounting panel 151.

More specifically, both ends of the worm wheel gear part 144 that constitutes the tilting axis may be connected to the tilt brackets 145, respectively, which are disposed outside the tilting housing 105 in parallel.

In this case, the pair of tilt brackets 145 rotate the steering mounting panels 151 that have been integrally formed in one ends of the pair of tilt brackets 145 around the tilting axis thereof by being rotated in conjunction with the worm wheel gear part 144 when the worm wheel gear part 144 is rotated. As a result, the pair of tilt brackets 145 tilt and rotate the antenna devices A1 and A2.

For reference, an indication symbol, such as an arrow, has been printed on the pair of tilt brackets 145 so that a worker recognizes a tilting angle of the tilt brackets. A tilting angle gauge 146 that is indicated by an arrow may be printed and formed on the outside of the tilting housing 105, which corresponds to the outside of the radius of rotation of the tilt brackets 145.

Accordingly, a worker can precisely adjust the first antenna device A1 and the second antenna device A2 at a desired tilting angle while viewing the arrow and the tilting angle gauge 146.

FIG. 10 is a side view illustrating the antenna devices after being tilted in FIG. 1.

There are advantages in that when the first antenna device A1 and the second antenna device A2 are installed by using the mounting apparatus for antenna devices on a support pole according to embodiments of the present disclosure, as referred in FIG. 10, the tilting rotations of the first antenna device A1 and the second antenna device A2 can be adjusted at the same angle or different angles simultaneously or at different times on the upper and lower sides of the tilting housing 105 on the basis of tilting axes TA and TB, respectively, by using the tilting means 140 and the steering rotations of the first antenna device A1 and the second antenna device A2 can be adjusted in the horizontal direction in accordance with a dual band frequency covering area by using the steering means 150.

Furthermore, there is an advantage in that the antenna devices A1 and A2 can be installed to the extent that two types of different frequency bands can be covered with respect to one tilting housing 105.

The mounting apparatus for antenna devices on a support pole according to the embodiments of the present disclosure has been described in detail with reference to the accompanying drawings. However, an embodiment of the present disclosure is not essentially limited to the aforementioned embodiment, and may include various modifications and implementations within an equivalent range thereof by a person having ordinary knowledge in the art to which the present disclosure pertains. Accordingly, the true range of a right of the present disclosure will be said to be defined by the appended claims.

INDUSTRIAL APPLICABILITY

The present disclosure provides the mounting apparatus for antenna devices on a support pole in which antenna devices can be intensively installed with respect to a support pole having a limited space, the directions of the antenna devices are easy, the antenna devices are installed at two upper and lower places with respect to a single support clamp of the support pole so that two types of frequency bands can be covered, and the direction of the antenna device for each frequency band toward a desired location can be easily adjusted by using the tilting means and/or the steering means.

The invention claimed is:

1. A mounting apparatus for antenna devices on a support pole, comprising:

a support clamp installed on the support pole; and a direction adjustment part comprising a tilting housing coupled to the support clamp, an upper tilting mechanism and a lower tilting mechanism for tilting and rotating two or more antenna devices that are coupled to be spaced apart from each other in a vertical direction through a medium of the support clamp in forward and backward directions through a medium of axes that extend through left and right sides of the tilting housing simultaneously or at different times and at least two steering mounting panels each with at least one guide slot and at least one guide bolt for steering and rotating the two or more antenna devices in a horizontal direction about a vertical axis, wherein the tilting and rotating of the tilting housing, the upper tilting mechanism and the lower tilting mechanism of the direction adjustment part is manually adjusted by a worker or automatically adjusted by power supply.

2. The mounting apparatus of claim 1, wherein the upper tilting mechanism comprises an upper driving motor, and an upper gear set for tilting a first antenna device that is disposed on an upper side of the tilting housing, and the lower tilting mechanism comprises a lower driving motor, and a lower gear set for tilting a second antenna device that is disposed on a lower side of the tilting housing.

3. The mounting apparatus of claim 2, wherein the upper tilting mechanism and the lower tilting mechanism comprise:

the tilting housing coupled to the support clamp;

an upper driving motor and a lower driving motor provided within the tilting housing and electrically rotated and driven;

an upper gear set and a lower gear set configured to output rotatory power of the upper driving motor and the lower driving motor by decelerating the rotatory power when the rotatory power is input; and an upper worm wheel gear part and a lower worm wheel gear part each configured to axially penetrate the tilting housing in the horizontal direction to constitute a tilting axis and to be rotated by receiving the driving power output by the gear set by worm wheel gear teeth formed in an outer circumferential surface thereof.

4. The mounting apparatus of claim 2, wherein the upper tilting mechanism and the lower tilting mechanism each comprises:

the tilting housing coupled to the support clamp;

an upper tilting adjustment bolt and a lower tilting adjustment bolt each rotatable around the horizontal axes within the tilting housing and each configured to have worm gear teeth formed in an outer circumferential surface thereof; and an upper worm wheel gear part and a lower worm wheel gear part each configured to axially penetrate the tilting housing in the horizontal direction to constitute a tilting axis and each rotated by an engagement of worm wheel gear teeth formed in an outer circumferential surface thereof and the worm gear teeth of each of the upper tilting adjustment bolt and the lower tilting adjustment bolt.

5. The mounting apparatus of claim 3, wherein:

the two or more antenna devices each have a bottom surface or a top surface coupled to a top surface or bottom surface of the respective steering mounting panel and are each capable of being steered and rotated in the horizontal direction, and the two or more antenna devices are coupled to be tilted and rotated in the forward and backward directions through a medium of a pair of tilt brackets integrally extended and formed so that the tilt brackets are adjacent to outsides on the left and right sides of the tilting housing.

6. The mounting apparatus of claim 5, wherein the tilt brackets are coupled to both ends of the worm wheel gear part so that the tilt brackets are rotated coaxially with the tilting axes.

7. The mounting apparatus of claim 1, wherein the steering mounting panels of the direction adjustment part comprise:

an upper steering mounting panel and a lower steering mounting panel each configured to have a top surface coupled to a bottom surface of any one of the two or more antenna devices or to have a bottom surface coupled to a top surface of another of the two or more antenna devices;

at least one guide slot formed in the upper steering mounting panel and lower steering mounting panel in a way to penetrate the upper steering mounting panel and lower steering mounting panel up and down so that the at least one guide slot corresponds to steering rotation trajectories of the antenna devices; and at least one guide bolt coupled to a lower or upper part of the antenna device by bolting to the lower or upper part of the antenna device through the at least one guide slot.

8. The mounting apparatus of claim 7, wherein the two or more antenna devices are coupled so that the steering rotations of the two or more antenna devices are adjustable in the horizontal direction within a range of the at least one guide slot formed in the upper steering mounting panel and lower steering mounting panel.

9. The mounting apparatus of claim 3, further comprising a wire enclosure that is disposed between the support clamp and the tilting housing and in which at least one external wire provided to be electrically connected to the at least two antenna devices is concealed and accommodated.

10. The mounting apparatus of claim 9, wherein a support wire installation hole in which an external wire is accommodated is communicatively formed in the support pole.

11. The mounting apparatus of claim 3, wherein:

the at least two antenna devices are connected to a control unit that is disposed within the tilting housing through a medium of a cable, and the cable is concealed and installed through a concealment cover that is attached to a rear surface of each of the at least two antenna devices.

12. The mounting apparatus of claim 11, wherein:

the steering mounting panels of the direction adjustment part comprise an upper steering mounting panel and a lower steering mounting panel configured to have a top surface coupled to a bottom surface of any one of the two or more antenna devices or a bottom surface coupled to a top surface of another of the two or more antenna devices, and the cable is connected to the rear surface part of the antenna device through the upper steering mounting panel and lower steering mounting panel after penetrating the tilting housing.

* * * * *